United States Patent
Hartley et al.

(10) Patent No.: US 11,853,743 B2
(45) Date of Patent: Dec. 26, 2023

(54) SAFE MODULAR UPGRADES

(71) Applicant: KORE Wireless Group, Inc., Atlanta, GA (US)

(72) Inventors: Peter Hartley, Cambridge (GB); Philip Michaelson-Yeates, Ely (GB); Jonathan Williams, Cambridge (GB); Hugo Fiennes, Palo Alto, CA (US); Tejas Patil, Cambridge (GB); Joseph Birr-Pixton, Cambridge (GB)

(73) Assignee: KORE Wireless Group, Inc., Atlanta, GA (US)

( * ) Notice: Subject to any disclaimer, the term of this patent is extended or adjusted under 35 U.S.C. 154(b) by 9 days.

(21) Appl. No.: 17/643,295

(22) Filed: Dec. 8, 2021

(65) Prior Publication Data
US 2023/0176857 A1 Jun. 8, 2023

(51) Int. Cl.
*G06F 9/44* (2018.01)
*G06F 8/656* (2018.01)
*G06F 21/57* (2013.01)
*G06F 8/658* (2018.01)

(52) U.S. Cl.
CPC ............ *G06F 8/656* (2018.02); *G06F 8/658* (2018.02); *G06F 21/572* (2013.01)

(58) Field of Classification Search
None
See application file for complete search history.

(56) References Cited

U.S. PATENT DOCUMENTS

| | | | |
|---|---|---|---|
| 8,463,254 B2 * | 6/2013 | Troster | G06F 8/656 717/173 |
| 2013/0152070 A1 * | 6/2013 | Bhullar | G06F 9/44521 717/173 |
| 2015/0288755 A1 * | 10/2015 | Mosko | H04L 67/63 709/248 |
| 2016/0364231 A1 * | 12/2016 | Tati | G06F 8/656 |
| 2019/0235908 A1 * | 8/2019 | Liguori | G06F 8/656 |
| 2021/0216306 A1 * | 7/2021 | Moeller | G06F 8/656 |

* cited by examiner

*Primary Examiner* — Qamrun Nahar
(74) *Attorney, Agent, or Firm* — Schwegman Lundberg & Woessner, P.A.

(57) ABSTRACT

An Internet of Things (IoT) device is deployed with embedded software that may comprise multiple components. After deployment, updated versions of one or more components of the embedded software may become available. The IoT device maintains a manifest of the installed components. Periodically, the IoT device requests an updated copy of the manifest from an upgrade server. The installed manifest and the updated manifest are compared to determine if updated versions of any components are available. If so, the IoT device requests only the components to be updated. Prior to beginning the copying of the upgraded components, an upgrade flag is set. The IoT device then begins copying the received components into memory, replaces the manifest with the updated manifest, and clears the upgrade flag.

20 Claims, 9 Drawing Sheets

400

IOT DEVICE TABLE — 410

| ACCOUNT | DEVICE ID |
|---------|-----------|
| 1 | 1 |
| 1 | 2 |
| 2 | 3 |
| 2 | 4 |

MANIFEST TABLE — 440

| MODULE | VERSION | HASH |
|--------|---------|------|
| KERNEL | 1.1 | 2CCCA4... |
| APPLICATION | 2.0 | 33E02E... |
| BOOTROM | 1.2 | B0D6E3... |
| NETWORKING | 3.1 | 8D4300... |

*FIG. 4*

SAFE MODULAR UPGRADES

TECHNICAL FIELD

An embodiment of the present subject matter relates generally to the Internet of Things (IoT) and, more specifically, to safe modular upgrades of software and firmware for IoT devices.

BACKGROUND

Software running on an IoT device is periodically updated to allow for new features or to patch security holes. If the updating of the software is interrupted, the IoT device may be left in a non-functional state.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 4 is a block diagram of an example database schema, suitable for use by an upgrade server to facilitate safe modular upgrades for IoT devices.

DETAILED DESCRIPTION

Figure 1:
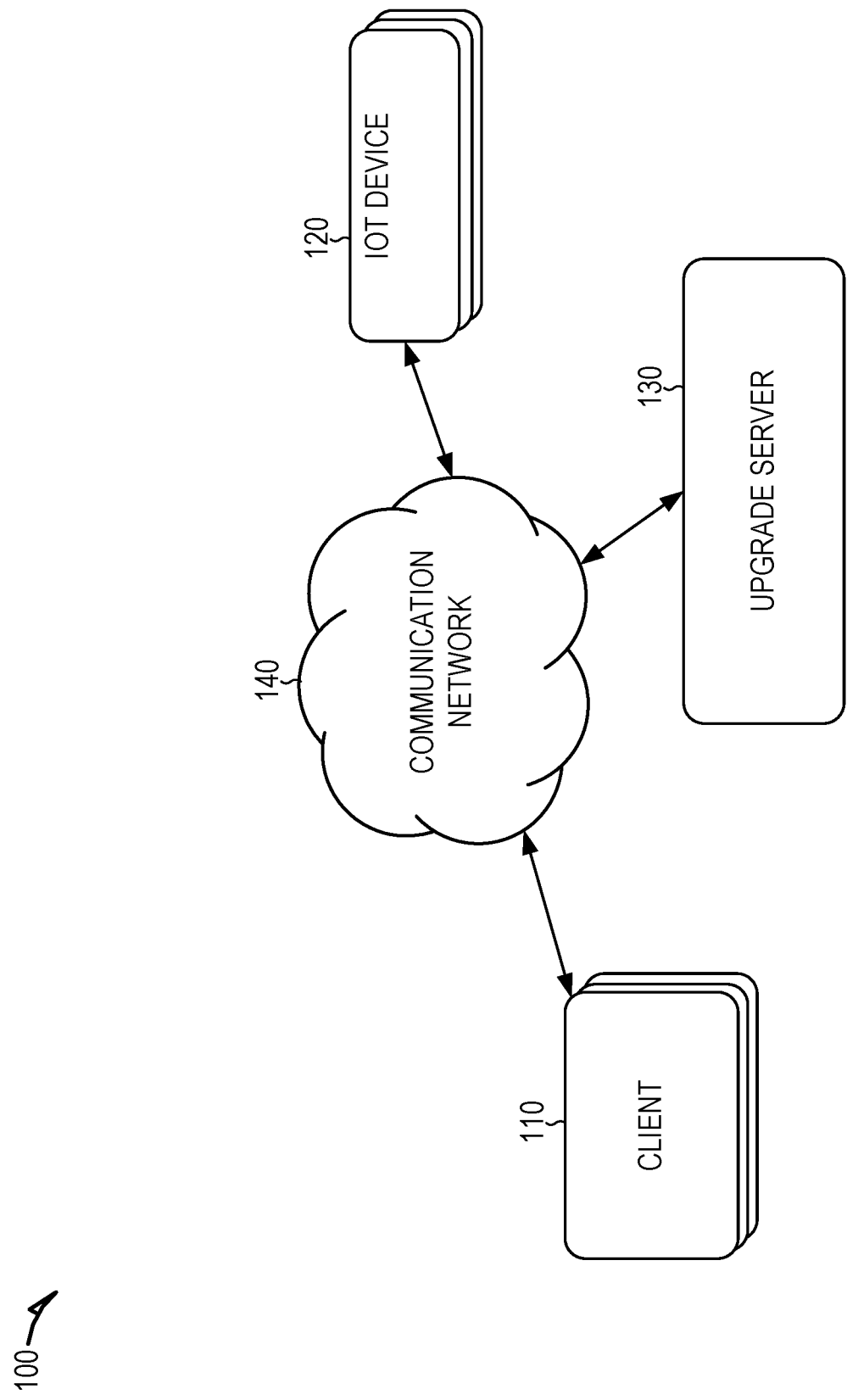
FIG. 1 shows an example network environment for safe modular upgrades for IoT devices, according to some example embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

An IoT device is deployed with embedded software. To prevent tampering and reverse engineering, the user of the IoT device is prevented from accessing the internal components of the software. The embedded software may comprise one or more public encryption keys, one or more private encryption keys, one or more symmetrical encryption keys, or any suitable combination thereof.

The embedded software of the IoT device may comprise multiple components. For example, a service provider may provide a kernel and networking functionality that enable the IoT device to connect to a network, send data, receive data, and execute an application. The application may be provided by a customer to provide specific functionality on the IoT device. For example, an IoT device with a camera may be configured by different applications to operate as a surveillance camera, an optical sensor for a robot, or a webcam. Each of these applications would have access to the kernel and networking functionality provided by the service provider. Thus, the application developer is saved from the effort of developing the components provided by the service provider and the service provider is protected from incompatibilities in functionality of the components that could arise if each application developer developed their own version of the components.

After deployment, updated versions of one or more components of the embedded software may become available. One method of upgrading the IoT software is for a server to prepare a complete image of the replacement software and transfer the replacement image to the IoT device. After receiving the replacement image, the IoT device overwrites the current copy of the software with the received image. However, this method may use more network bandwidth and take more time to transfer than is needed when only a subset of the components of the embedded software are being updated. Additionally, if the IoT device is power cycled while the replacement image is only partially copied, the resulting memory state may leave the IoT device unusable.

The IoT device maintains a manifest of the installed components and a hash of each installed component. Periodically (e.g., each time the IoT device connects to an upgrade server, every 24 hours, or any suitable combination thereof), the IoT device requests an updated copy of the manifest from an upgrade server. The installed manifest and the updated manifest are compared to determine if updated versions of any components are available. If so, the IoT device requests only the components to be updated. Thus, components already present on the IoT device that have not been changed are not sent over the network.

The received components are hashed and the resulting hash values are compared with the hash values in the updated manifest. Thus, the IoT device verifies that the received components were received correctly. In the event that the hash values do not match, the received component is not installed, but instead is requested again.

Prior to beginning the copying of the upgraded components, an upgrade flag is set. The IoT device then begins copying the received components into memory, replaces the manifest with the updated manifest, and clears the upgrade flag. If the IoT device is power cycled before the upgrade process is complete, the upgrade flag will not have been cleared, and so will be detected when the IoT device reboots, allowing the IoT device to resume the upgrade process rather than attempting to execute the (partially upgraded) embedded software.

Thus, by use of the systems and methods described herein, an upgrade server allows for only individual upgraded software components to be transferred to a IoT device over a network. Additionally, the IoT device is always in a recoverable state in the event of power loss during the upgrade process.

FIG. 1 shows an example network environment 100 for safe modular upgrades for IoT devices, according to some example embodiments. As shown, multiple devices (i.e., debug clients 110, IoT devices 120, and an upgrade server 130) are connected to a communication network 140 and configured to communicate with each other through use of the communication network 140. The communication network 140 is any type of network, including a local area network (LAN), such as an intranet; a wide area network (WAN), such as the Internet; a telephone and mobile device network, such as a cellular network; or any combination thereof. Further, the communication network 140 may be a public network, a private network, or a combination thereof. The communication network 140 is implemented using any number of communication links associated with one or more service providers, including one or more wired communication links, one or more wireless communication links, or any combination thereof. Additionally, the communication network 140 is configured to support the transmission of data formatted using any number of protocols.

Multiple computing devices can be connected to the communication network 140. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, and the like, from another computing device in network communication with the computing device and to pass the communication along to an appropriate module running on the computing device. The communication interface also sends a communication to another computing device in network communication with the computing device.

In the network environment 100, a user of a client 110 generates updates for software running on an IoT device 120. The client 110 uploads the update to the upgrade server 130, for deployment on the IoT device 120. The communications between the client 110 and the upgrade server 130, as well as the communications between the IoT device 120 and the upgrade server 130, may be encrypted using a point-to-point encryption protocol.

One skilled in the art would appreciate that the network environment 100 can include any number of clients 110, IoT devices 120, and/or upgrade servers 130. Further, each upgrade server 130 may concurrently accept communications from and initiate communication messages and/or interact with any number of clients 110 and IoT devices 120, and support connections from a variety of different types of clients 110, such as desktop computers; mobile computers; mobile communications devices, e.g., mobile phones, smart phones, tablets; smart televisions; set-top boxes (STBs); and/or any other network enabled computing devices. Hence, the clients 110 may be of varying type, capabilities, operating systems, and so forth. Similarly, the IoT devices 120 may be devices of varying types such as smart appliances, sensors, smart fire alarms, smart door locks, medical sensors, security systems, fitness trackers, and the like.

A user interacts with an upgrade server 130 via a client-side application installed on the client 110. In some embodiments, the client-side application includes a component specific to the upgrade server 130. For example, the component may be a stand-alone application, one or more application plug-ins, and/or a browser extension. However, the users may also interact with the upgrade server 130 via a third-party application, such as a web browser or messaging application, that resides on the client 110 and is configured to communicate with the upgrade server 130. In either case, the client-side application presents a user interface (UI) for the user to interact with the upgrade server 130. For example, the user interacts with the upgrade server 130 via a client-side application integrated with the file system or via a webpage displayed using a web browser application.

The upgrade server 130 provides a channel by which the client 110 can upgrade embedded software running on the IoT device 120. The IoT device 120 connects to the upgrade server 130. The connection with the upgrade server 130 serves multiple purposes. For example, sensor data may be reported by the IoT device 120 to the upgrade server 130 to provide a web application that monitors the status of the IoT device 120. Additionally, data indicating the version of available software may be sent from the upgrade server 130 to the IoT device 120.

The IoT device 120 may determine that the available software is newer than the software currently installed on the IoT device 120 and request the upgraded software from the upgrade server 130. The upgrade server 130 responds by providing the upgraded software to the IoT device 120, which installs the received software. The IoT device 120 may request only the portions of the software that have been upgraded, and may install the software in a manner that ensures that the IoT device 120 is able to complete the installation even if power is lost during the upgrade.

By using the upgrade server 130 to intermediate the upgrades generated by the client 110, with the IoT device 120 using a single channel to communicate with the upgrade server 130 for both application data and upgrade data, no additional channel is used to communicate upgrade data and upgraded software. Thus, if the IoT device 120 is behind a firewall, no additional ports need to be opened to allow the upgrade connection. By comparison with upgrade connections that use an incoming connection from the debug client 110 to the IoT device 120, this simplifies the setup for a user of the IoT device 120 and increases the likelihood of the upgrade connection being successfully established.

Figure 2:
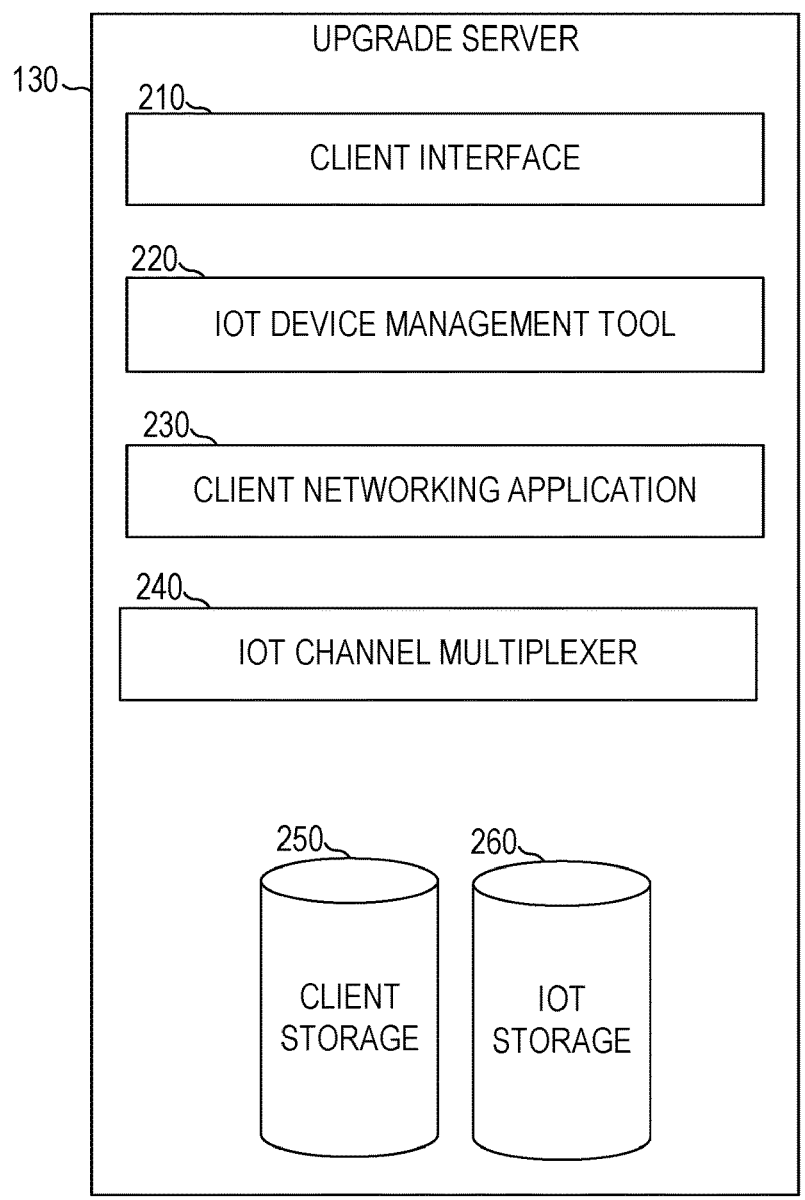
FIG. 2 is a system diagram of an upgrade server, according to some example embodiments.

FIG. 2 is a system diagram of an upgrade server 130, according to some example embodiments. As shown, the upgrade server 130 includes a client interface module 210, an IoT device management tool 220, a client networking application 230, an IoT channel multiplexer module 240, a client storage 250, and an IoT storage 260. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the upgrade server 130 to facilitate additional functionality that is not specifically described herein. Furthermore, the various functional modules depicted in FIG. 2 may reside on a single computing device or may be distributed across several computing devices in various arrangements such as those used in cloud-based architectures.

The client interface module 210 provides an interface that enables a user of the client 110 to select IoT devices 120 for upgrading, to upload upgraded software for the selected IoT devices 120, or any suitable combination thereof. The client storage 250 stores data related to the clients 110, where it may be accessed by other modules of the upgrade server 130. The client data stored in the client storage 250 may be associated with data identifying the client 110, a customer associated with the client 110, or both. For example, the point-to-point encryption key may be associated with a unique identifier allocated to the client 110 and/or an account of the customer with the upgrade server 130. In some example embodiments, the point-to-point encryption key is negotiated anew with each session (e.g., using the transport layer security (TLS) 1.2 or TLS1.3 protocol).

The IoT device management tool 220 may provide a user interface to view data captured by the IoT devices 120 (e.g., to view video captured by a security camera, to view heart rate data captured by a fitness tracker, and the like). The IoT device management tool 220 may send upgrade data to the IoT devices 120, receive requests for upgrade data from the IoT devices 120, send upgraded software to the IoT devices 120, receive requests for upgraded software from the IoT devices 120, or any suitable combination thereof. The IoT storage 260 stores data related to the IoT devices 120, where it may be accessed by other modules of the upgrade server 130. The IoT data stored in the IoT storage 260 may be associated with data identifying the IoT device 120, a customer associated with the IoT device 120, or both.

The client networking application 230 communicates with a networking application to establish a secure channel with the client 110. Using the secure channel, the client 110 provides upgraded software for provision to the IoT device 120. The client networking application 230 may use point-to-point encryption to secure the communications with the client 110, preventing a third party that intercepts the communications from accessing the upgraded software.

The IoT channel multiplexer module 240 multiplexes multiple communication streams over a single communication channel between the upgrade server 130 and an IoT device 120. Thus, an application communication stream and an upgrade communication stream can be in use simultaneously over a single communication connection. The application communication stream is a communication with an application programming interface (API) provided by the application. For example, a heart rate monitor may be turned on or off and heart rate data may be reported. The upgrade communication stream comprises information about available software, upgraded software, or both.

Figure 3:
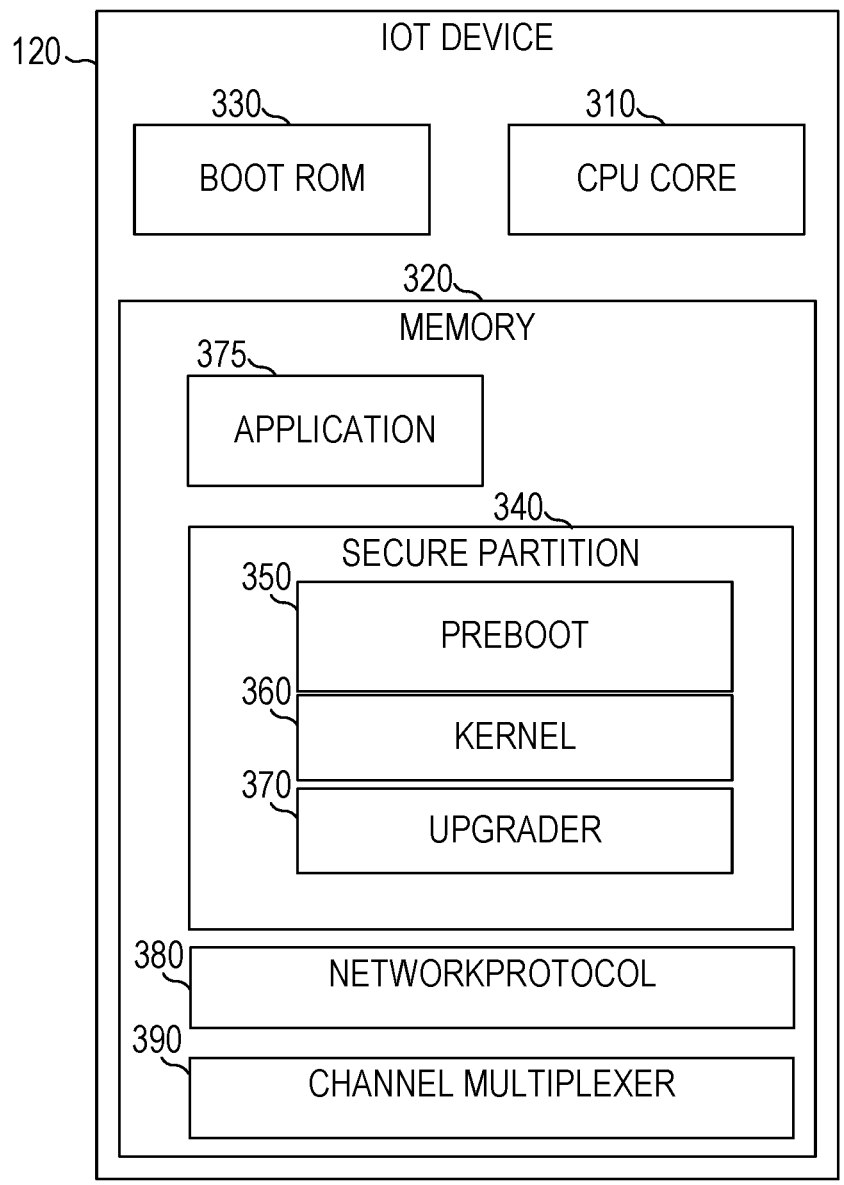
FIG. 3 is a system diagram of an IoT device, according to some example embodiments.

FIG. 3 is a system diagram of an IoT device 120, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the IoT device 120 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the IoT device 120 includes a Central Processing Unit (CPU) core 310, memory 320, and a boot read only memory (ROM) 330. The memory 320 stores an application 375, a secure partition 340, a network protocol 380, and a channel multiplexer 390. The IoT device 120 separates the memory into "secure" and "non-secure" partitions. Executable code and data outside of the secure partition 340 is in the non-secure partition. Within the secure partition 340 are preboot instructions (also referred to as "preboot") 350, a kernel 360, and an upgrader 370. One example embodiment of a secure/non-secure divide is provided by ARM® TrustZone® technology.

When the IoT device 120 is powered up, the CPU core 310 begins by executing the preboot 350. Typically, the preboot 350 causes the kernel 360 to begin executing along with the application 375. As discussed in more detail with respect to FIG. 7, this process may be modified to ensure that a partial upgrade (e.g., an upgrade of the application 375 that is interrupted by a loss of power) does not cause the IoT device 120 to cease functioning.

The kernel 360 may use the channel multiplexer 390 to request upgrade data from the upgrade server 130 over a multiplexed channel. Based on the upgrade data, the kernel 360 may request upgraded software from the upgrade server 130. The upgraded software is stored in a staging location by the kernel 360 and then installed by the upgrader 370, upgrading one or more of the application 375, the kernel 360, the upgrader 370, the network protocol 380, and the channel multiplexer 390.

The CPU core 310 of the IoT device 120 executes the application 375. Output from the application 375 is sent to the upgrade server 130 using the network protocol 380. The channel multiplexer 390 may modify the outgoing packets to indicate a virtual channel for the output packets (e.g., by indicating that the packets contain application data or upgrade data).

The channel multiplexer 390 multiplexes upgrade and application data streams over a single network connection. Thus, communications for the application 375 are provided to the application 375 and communications for the upgrader 370 are provided to the upgrader 370. The network protocol 380 or the channel multiplexer 390 may encrypt outgoing data packets using point-to-point encryption, decrypt incoming packets using point-to-point encryption, or both.

FIG. 4 is a block diagram of an example database schema 400, suitable for use by an upgrade server 130 to facilitate safe modular upgrades for IoT devices 120. The database schema 400 includes an IoT device table 410 and a manifest table 440. The IoT device table 410 includes rows 430A, 430B, 430C, and 430D of a format 420. The manifest table 440 includes rows 460A, 460B, 460C, and 460D of a format 450.

Each row 430A-430D of the IoT device table 410 stores data for a different IoT device 120. The format 420 shows that the rows 430A-430D store an account identifier and a device identifier for each IoT device 120. Each IoT device 120 has a unique device identifier. The account identifier for an IoT device 120 indicates which account receives data generated by the IoT device 120, is permitted to control the IoT device 120, is permitted to upgrade software of the IoT device 120, or any suitable combination thereof.

The manifest table 440 stores data for software modules of the IoT devices 120. Each of the rows 460A-460D stores a module name, a version number, and a hash of the module.

The row 460A indicates that the upgrade server 130 has version 1.1 of the kernel module. The row 460B indicates that the upgrade server 130 has version 2.0 of the application module. The database schema 400 may include a separate manifest table 440 for each account or an account column may be included in the manifest table 440. In this way, manifest data may be stored for multiple accounts.

When an upgraded module is provided to the upgrade server 130 from a client 110, the row for the upgraded module is updated with the new version number and hash of the upgraded module. Thereafter, when an IoT device 120 requests a manifest, the updated data from the manifest table 440 is provided in response. The IoT device 120 detects that the version number, hash, or both has changed from the version of the module currently installed on the IoT device 120 and, based on the change, requests the upgraded module from the upgrade server 130.

In some example embodiments, the manifest table 440 identifies a memory region (e.g., a start memory address and a size) for each module. For example, each module may be loaded into a predetermined address range when the IoT device 120 boots. In some example embodiments, the memory region for different modules is inside or outside of the secure partition 340. For example, the kernel 360 may be within a memory region of the secure partition 340 and the application 375 may be outside of the memory region of the secure partition 340.

Figure 5:
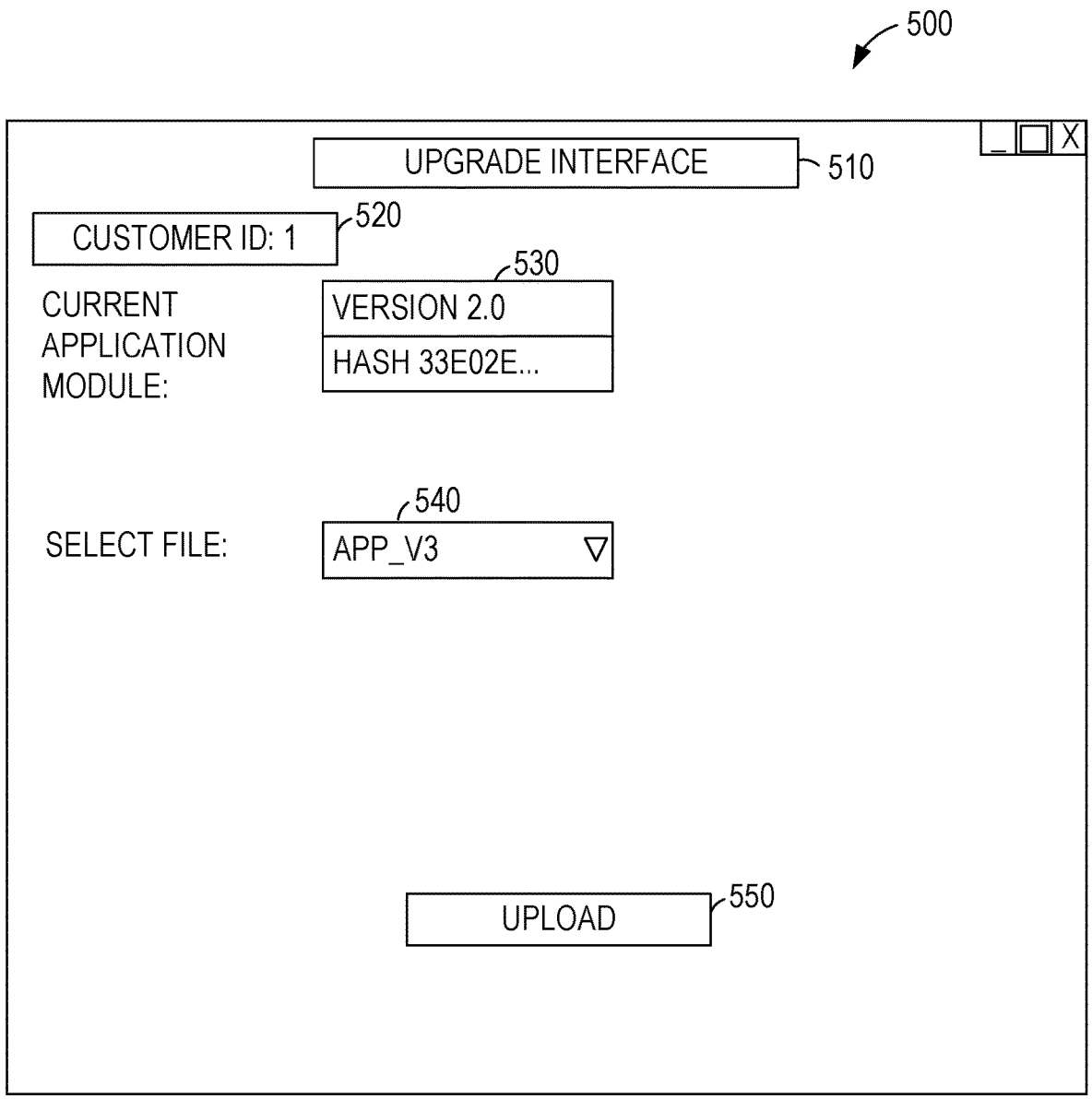
FIG. 5 is an example user interface for submitting application upgrades to an upgrade server, according to some example embodiments.

FIG. 5 is an example user interface 500 for submitting application upgrades to an upgrade server, according to some example embodiments. The user interface 500 includes a title 510, a customer information area 520, current module information 530, a file selector 540, and button 550. The user interface 500 may be displayed on a display device of a user associated with the customer indicated in the customer information area 520. For example, with reference to FIG. 1, the upgrade server 130 may cause a web browser running on a client 110 associated with customer 1 to display the user interface 500.

The title 510 indicates that the user interface 500 is for providing upgraded modules to the upgrade server 130. The customer information area 520 informs the user of the customer for which modules are being upgraded. The current module information 530 identifies the current version of the module being upgraded, the hash of the module, the name of the module, or any suitable combination thereof. In the example of FIG. 5, the upgrade interface allows the user to upgrade only the application module (e.g., the application 375 of FIG. 3). In other example embodiments, the user interface 500 allows the upgrade server 130 to receive a selection of the module being upgraded.

The file selector 540 receives a selection of a file to be uploaded to the upgrade server 130. The selected file includes the upgraded module. In response to a press (e.g., a click of a mouse or a touch on a touchscreen) of the button 550, the client 110 transmits the selected file to the upgrade server 130 over the network 140. The upgrade server 130 receives the transmitted file, stores the upgraded module, and updates the manifest table 440. In some example embodiments, the communication from the client 110 to the upgrade server 130 includes a hash of the software module. The upgrade server 130 may compute the hash of the software module and compare the computed hash with the received hash to verify that the module was not corrupted during transmission. Either the received hash or the computed hash may be stored in the manifest table 440.

After the upgraded module is received by the upgrade server 130, when an IoT device 120 connects to the upgrade server 130, the updated manifest is provided to the IoT device 120. Receiving the updated manifest may cause the IoT device 120 to request and install the upgraded module.

Figure 6:
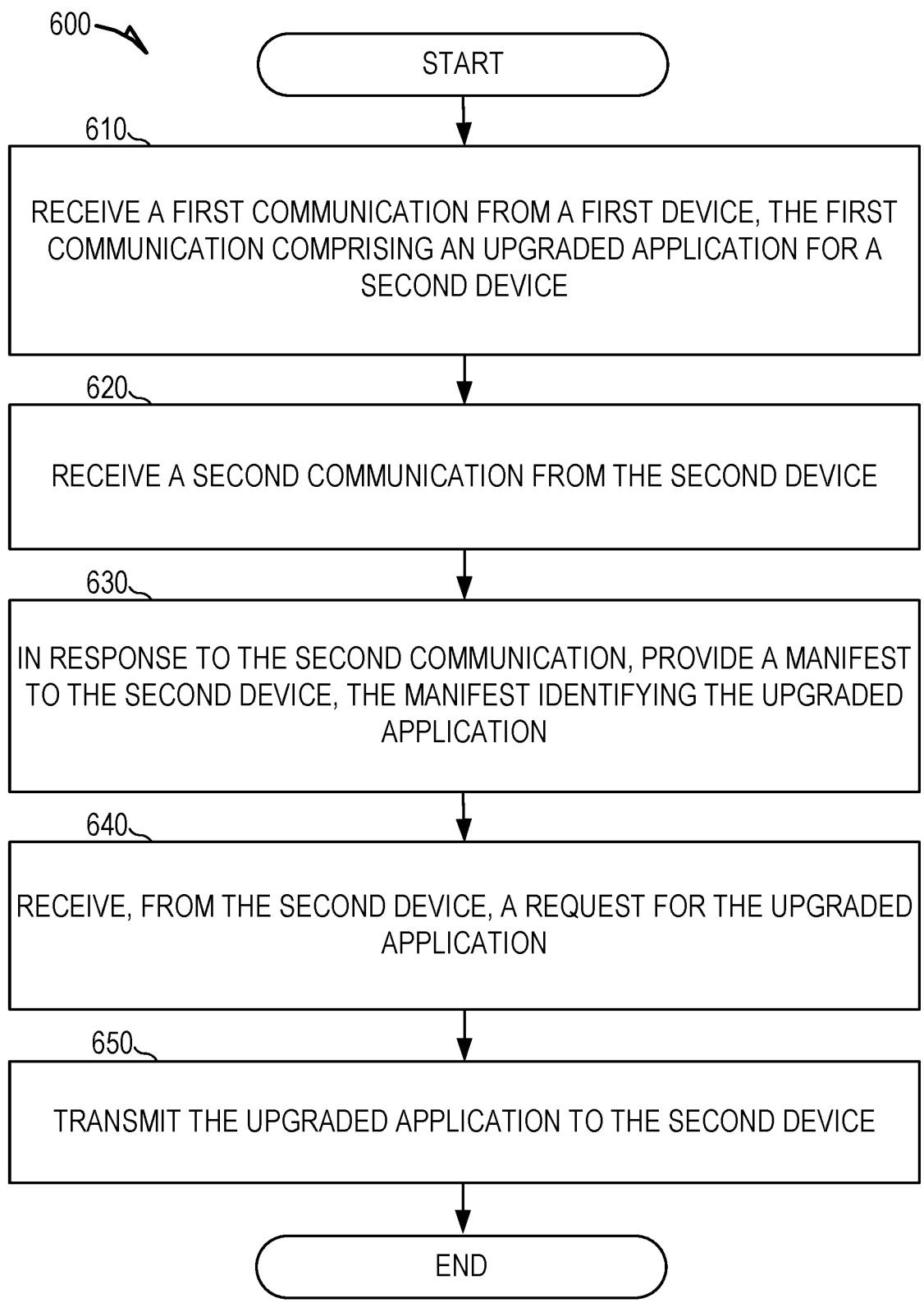
FIG. 6 is a flowchart showing a method for providing safe modular upgrades to an IoT device, according to some example embodiments.

FIG. 6 is a flowchart showing a method 600 for providing safe modular upgrades to an IoT device, according to some example embodiments. The method 600 may be embodied in computer-readable instructions for execution by one or more processors such that the operations of the method 600 may be performed in part or in whole by the upgrade server 130; accordingly, the method 600 is described below by way of example with reference thereto. However, it shall be appreciated that at least some of the operations of the method 600 may be deployed on various other hardware configurations and the method 600 is not intended to be limited to the upgrade server 130.

In operation 610, the upgrade server 130 receives a first communication from a first device (e.g., the client 110), the first communication comprising an updated application (e.g., the application 375 of FIG. 3) for a second device (e.g., the IoT device 120). The first communication may include an unencrypted portion (e.g., data used to route the first communication from the first device to the upgrade server 130), an encrypted portion encrypted using point-to-point encryption (e.g., an encrypted copy of the updated application), or both.

The upgrade server 130, in operation 620, receives a second communication from the second device. For example, the IoT device 120 may request a manifest from the upgrade server 130. The request may be transmitted periodically (e.g., every 24 hours), during the boot process of the IoT device 120, or both.

In response to the second communication, the upgrade server 130 provides a manifest to the second device (operation 630). The manifest identifies the upgraded application. For example, a manifest may be generated from the manifest table 440. The manifest may identify all modules for the IoT device 120 along with a version number for each module, a hash of each module, or any suitable combination thereof.

In operation 640, the upgrade server 130 receives, from the second device, a request for the upgraded application. For example, the IoT device 120 may determine from the hash in the manifest and a locally stored hash of the currently installed version of the application that the upgrade server 130 has an upgraded version of the application. Based on this determination, the IoT device 120 requests the upgraded application from the upgrade server 130.

The upgrade server 130, in operation 650, transmits the upgraded application to the second device. In some example embodiments, the second communication is sent using a multiplexer that allows multiple communication streams to be sent over a single channel. Thus, the method 600 allows the upgrade server 130 to intermediate the provision of application upgrades from the clients 110 to the IoT devices 120.

Figure 7:
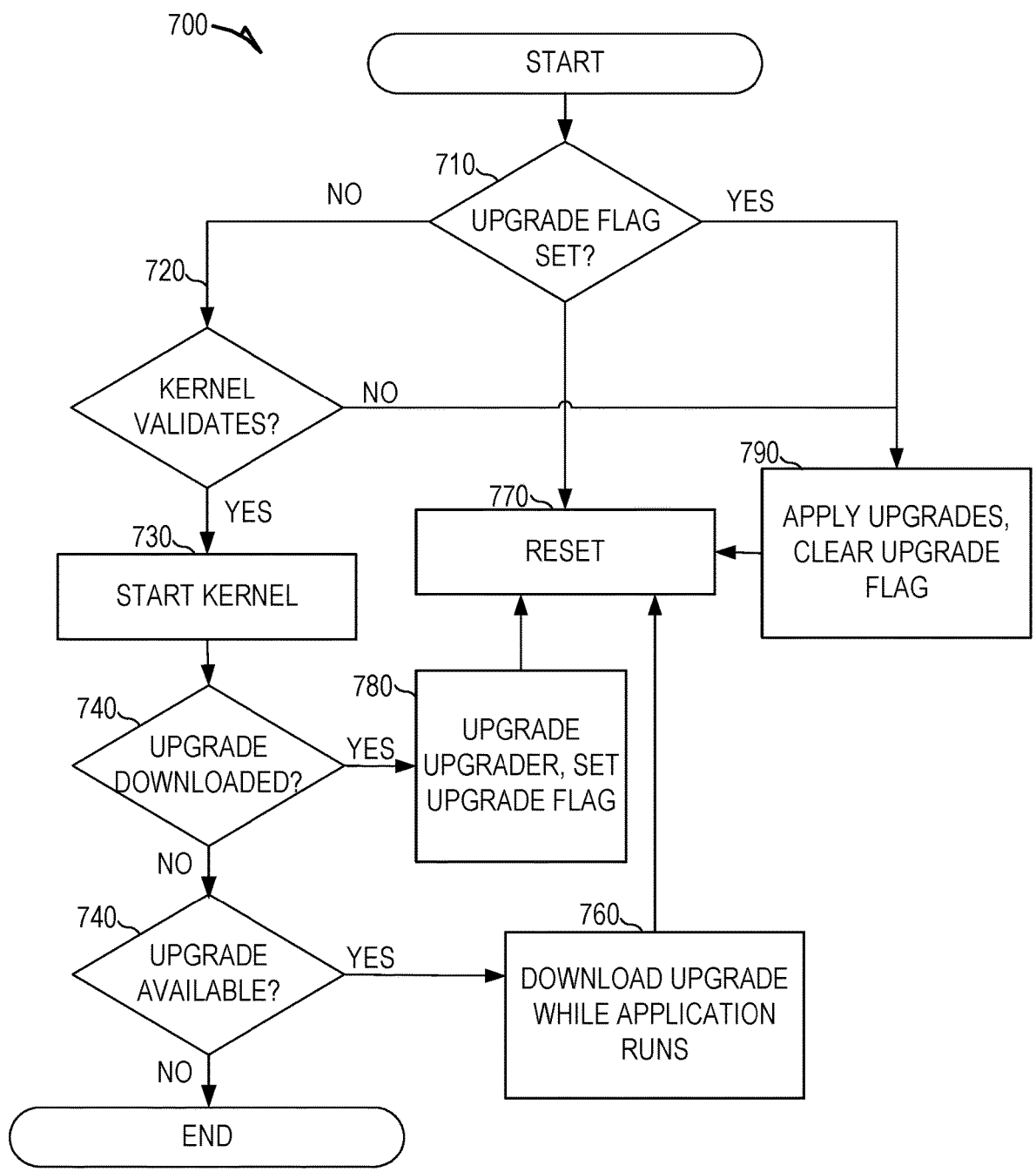
FIG. 7 is a flowchart showing a method for receiving and applying safe modular upgrades in an IoT device, according to some example embodiments.

FIG. 7 is a flowchart showing a method 700 for receiving and applying safe modular upgrades in an IoT device, according to some example embodiments. The method 700 may be embodied in computer-readable instructions for execution by one or more processors such that the operations of the method 700 may be performed in part or in whole by the IoT device 120; accordingly, the method 700 is described below by way of example with reference thereto. However, it shall be appreciated that at least some of the operations of the method 700 may be deployed on various other hardware configurations and the method 700 is not intended to be limited to the IoT device 120.

In operation 710, the preboot 350 checks to see if an upgrade flag is set. Thus, the method 700 may be performed in response to powering on the IoT device 120. During non-upgrade operation, the upgrade flag will not be set and the method 700 proceeds to the operation 720. If the upgrade flag has been set, the method 700 proceeds to the operation 790.

The preboot 350, in operation 720, attempts to validate the kernel 360. For example, the preboot 350 may generate a hash of the kernel 360 and compare it to a stored value of the hash. If the generated hash matches the stored hash, the method 700 proceeds to the operation 730. In the unusual event that the validation of the kernel 360 fails, the method 700 attempts to recover the kernel 360 by proceeding to operation 790.

In operation 730, the preboot 350 starts the kernel 360. The kernel 360, in operation 740, checks to see if an upgrade has been downloaded. For example, a folder of a local file system may be dedicated to storing downloaded upgrades. By checking to see if the folder contains any files, the kernel 360 is able to determine if any upgrades have been downloaded. If no upgrades have been downloaded, the method 700 proceeds with operation 740. Otherwise, operation 780 is performed next.

The kernel 360 determines, in operation 740, if an upgrade is available. For example, the kernel 360 may request a manifest from the upgrade server 130 and compare the received manifest with a manifest for the modules currently installed on the IoT device 120. If no differences are detected, no upgrade is available and the method 700 is complete. The IoT device 120 is up to date and the kernel 360 begins execution of the application 375. In some example embodiments, the IoT device 120 uploads a copy of a local manifest to the upgrade server 130. The upgrade server 130 determines which modules are installed on the IoT device 120 from the copy of the local manifest and sends a manifest only for the installed modules (e.g., by querying the manifest table 440 for rows matching the names of modules in the local manifest).

However, if any differences in the manifests are detected in operation 740, an upgrade is available and processing continues with operation 760. The detection of the availability of the upgrade may be on a module-by-module basis. For example, an upgrade for the kernel 360 may be available while no upgrade is available for the application 375. Accordingly, in operation 760, only the upgraded version of the kernel 360 is downloaded and the remaining modules are not downloaded.

In operation 760, the kernel 360 downloads one or more upgrades from the upgrade server 130 while the application 375 runs. The upgrade may comprise upgraded software for a module and a hash of the upgraded software. In some example embodiments, the kernel 360 starts two processes to execute in parallel, the channel multiplexer 390 may allow two communication streams to share a multiplexed channel, or any suitable combination thereof. Thus, the IoT device 120 may multiplex, on a single connection, multiple data streams comprising a first data stream for communication by an application and a second data stream for receiving the upgrade module.

After the download is complete, the IoT device 120 is reset (operation 770). Resetting the IoT device 120 causes the method 700 to begin again, with operation 710. The upgrade flag has not been set, so the process continues through operations 710-740. However, on this iteration, an upgrade has been downloaded, so the kernel 360 proceeds with operation 780. In operation 780, the kernel 360, if the downloaded upgrades include an upgrade to the upgrader 370, upgrades the upgrader 370. After the upgrade to the upgrader 370 is complete, the upgrade is marked as being complete (e.g., by moving a downloaded upgrade file to a completed upgrades folder). Then the kernel 360 sets the upgrade flag (e.g., in non-volatile memory) and resets the IoT device 120 (operation 770). By not setting the upgrade flag until after completing the upgrade of the upgrader 370, the method 700 will recover from a loss of power during the upgrade of the upgrader 370 because the same sequence of operations will be performed when rebooting, causing the upgrade of the upgrader 370 to be performed again if the upgrade is still available (e.g., has not been moved from the available upgrade folder).

Installing an upgraded module (in operations 780 and 790) may include erasing a portion of memory allocated to the module, decrypting the received module using a point-to-point or end-to-end encryption key, or both. For example, the module may be encrypted using a point-to-point encryption that protects the communication between the upgrade server 130 and the IoT device 120. As another example, the module may be encrypted by the client 110 using end-to-end encryption and stored in encrypted form by the upgrade server 130. Thus, the IoT device 120 may decrypt the module using end-to-end encryption and the upgrade server 130 is prevented from accessing the upgraded module even while acting as an intermediary between the client 110 and the IoT device 120. The IoT device 120 generates a hash of the received module (either after or before decryption, in various example embodiments) and compares the generated hash to the hash of the module received in operation 740. The IoT device 120 compares the generated hash to the received hash to verify the received module. If the hashes match, the download was successful. If the hashes do not match, the module is downloaded again. In some example embodiments, the decryption and hash checking is performed as part of operation 760 instead of operations 780-790.

After the IoT device 120 is reset, the method 700 begins again with operation 710. On this iteration, the upgrade flag is set, so the method 700 proceeds with operation 790. In the event that power fails during the setting of the upgrade flag, the value of the upgrade flag may be corrupted and fail an error correction code (ECC) check when the flag is read during operation 710. In that case, operation 710 treats the upgrade flag as being set.

In operation 790, the upgrader 370 applies the upgrades and then clears the upgrade flag. After each upgrade is complete, the completed upgrade is marked as being complete (e.g., by moving a corresponding downloaded upgrade file to a completed upgrades folder). By not clearing the upgrade flag until after completing the upgrade of the kernel 360, the network protocol 380, the channel multiplexer 390, the application 375, or any combination thereof, the method 700 will recover from a loss of power during operation 790 because the upgrade flag will still be set when the IoT device 120 reboots. As a result, operation 790 will be performed again, ensuring that no module is left in a partially-upgraded state. After the upgrades are complete, the upgrade flag is cleared and the IoT device 120 is reset (operation 770).

If the memory region for one or more modules has changed, the affected modules may be reinstalled whether or not the module itself was changed. For example, one module may grow in size such that its allocated memory region needs to be expanded. As a result, another module that was allocated adjacent memory may be relocated. To accommodate this, both modules are reinstalled.

On this iteration, when the IoT device 120 resets, the method 700 proceeds as in the first-described iteration, except that now the upgraded versions of the kernel 360, the upgrader 370, the network protocol 380, the channel multiplexer 390, the application 375, or any suitable combination thereof are now in place. The preboot 350 checks the upgrade flag (operation 710), validates and starts the kernel 360 (operations 720-730), checks to see if any upgrades have been downloaded (operation 740), and then checks if any upgrades are available from the upgrade server 130 (operation 750). If further upgrades are available, the upgrade process repeats as described above. Otherwise, the method 700 completes and the IoT device 120 runs the (upgraded) application 375.

In view of the above-described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: accessing, by one or more processors, a local manifest that identifies a first module, a first local hash of the first module, a second module, and a second local hash of the second module; accessing, by the one or more processors, a remote manifest that identifies the first module, a first remote hash of the first module, the second module, and a second remote hash of the second module; determining that the first local hash is different from the first remote hash; determining that the second local hash is equal to the second remote hash; and receiving, over a network, the first module without receiving the second module.

In Example 2, the subject matter of Example 1 includes multiplexing, on a single connection, multiple data streams comprising a first data stream for communication by an application and a second data stream for receiving the first module.

In Example 3, the subject matter of Examples 1-2 includes decrypting the received first module; generating a hash of the received first module; and comparing the generated hash to the first remote hash to verify the received first module.

In Example 4, the subject matter of Examples 1-3, wherein: the local manifest further identifies a first memory region for the first module and a second memory region for the second module.

In Example 5, the subject matter of Examples 1-4 includes transmitting, over the network, the local manifest; and receiving, over the network, the remote manifest.

In Example 6, the subject matter of Examples 1-5, wherein the first module of the local manifest is an application module.

In Example 7, the subject matter of Examples 1-6, wherein the first module of the local manifest is a kernel module.

In Example 8, the subject matter of Examples 1-7, wherein: the local manifest further identifies a third module; the remote manifest further identifies the third module; and the method further comprises: receiving, over the network, the third module; validating the received first module; validating the received third module; and installing the received first module and the received third module based on the validating of the received first module and the received third module.

Example 9 is a system comprising: one or more computer processors; and one or more computer-readable mediums storing instructions that, when executed by the one or more computer processors, cause the system to perform operations comprising: accessing a local manifest that identifies a first module, a first local hash of the first module, a second module, and a second local hash of the second module; accessing a remote manifest that identifies the first module, a first remote hash of the first module, the second module, and a second remote hash of the second module; determining that the first local hash is different from the first remote hash; determining that the second local hash is equal to the second remote hash; and receiving, over a network, the first module without receiving the second module.

In Example 10, the subject matter of Example 9, wherein the operations further comprise: multiplexing, on a single connection, multiple data streams comprising a first data stream for communication by an application and a second data stream for receiving the first module.

In Example 11, the subject matter of Examples 9-10, wherein the operations further comprise: decrypting the received first module; generating a hash of the received first module; and comparing the generated hash to the first remote hash to verify the received first module.

In Example 12, the subject matter of Examples 9-11 includes, wherein: the local manifest further identifies a first memory region for the first module and a second memory region for the second module.

In Example 13, the subject matter of Examples 9-12, wherein the operations further comprise: transmitting, over the network, the local manifest; and receiving, over the network, the remote manifest.

In Example 14, the subject matter of Examples 8-13, wherein: the local manifest further identifies a third module; the remote manifest further identifies the third module; and the operations further comprise: receiving, over the network, the third module; validating the received first module; validating the received third module; and installing the received first module and the received third module based on the validating of the received first module and the received third module.

Example 15 is a non-transitory computer-readable medium storing instructions that, when executed by one or more computer processors of one or more computing devices, cause the one or more computing devices to perform operations comprising: accessing a local manifest that identifies a first module, a first local hash of the first module, a second module, and a second local hash of the second module; accessing a remote manifest that identifies the first module, a first remote hash of the first module, the second module, and a second remote hash of the second module; determining that the first local hash is different from the first remote hash; determining that the second local hash is equal to the second remote hash; and receiving, over a network, the first module without receiving the second module.

In Example 16, the subject matter of Example 15, wherein the operations further comprise: multiplexing, on a single connection, multiple data streams comprising a first data stream for communication by an application and a second data stream for receiving the first module.

In Example 17, the subject matter of Examples 15-16, wherein the operations further comprise: decrypting the received first module; generating a hash of the received first module; and comparing the generated hash to the first remote hash to verify the received first module.

In Example 18, the subject matter of Examples 15-17 includes, wherein: the local manifest further identifies a first memory region for the first module and a second memory region for the second module.

In Example 19, the subject matter of Examples 15-18, wherein the operations further comprise: transmitting, over the network, the local manifest; and receiving, over the network, the remote manifest.

In Example 20, the subject matter of Examples 15-19, wherein the first module of the local manifest is an application module.

Example 21 is at least one machine-readable medium including instructions that, when executed by processing circuitry, cause the processing circuitry to perform operations to implement of any of Examples 1-20.

Example 22 is an apparatus comprising means to implement any of Examples 1-20.

Example 23 is a system to implement any of Examples 1-20.

Example 24 is a method to implement any of Examples 1-20.

Software Architecture

Figure 8:
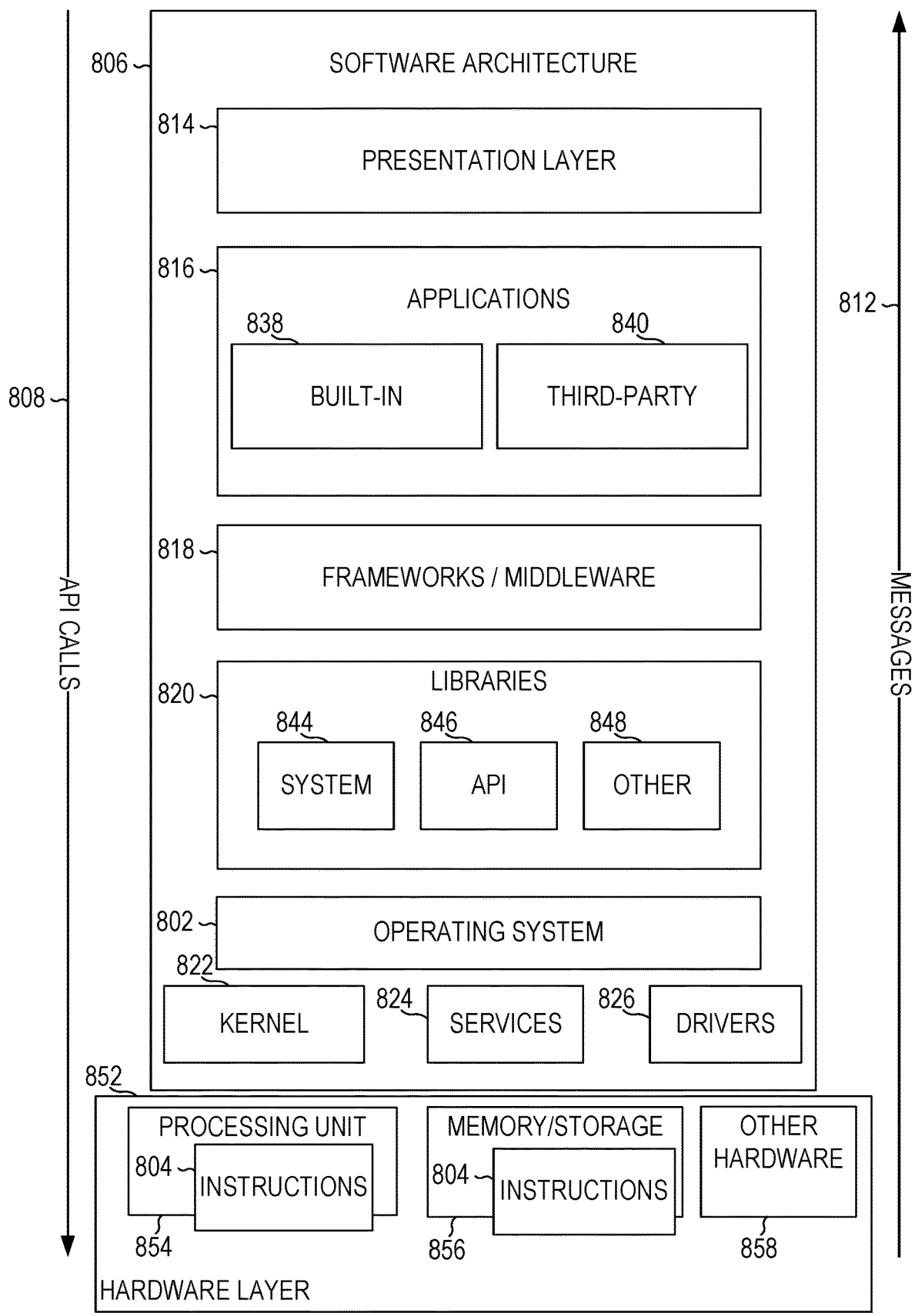
FIG. 8 is a block diagram illustrating an example software architecture, which may be used in conjunction with various hardware architectures herein described

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 910, memory 930, and (input/output) I/O components 950. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
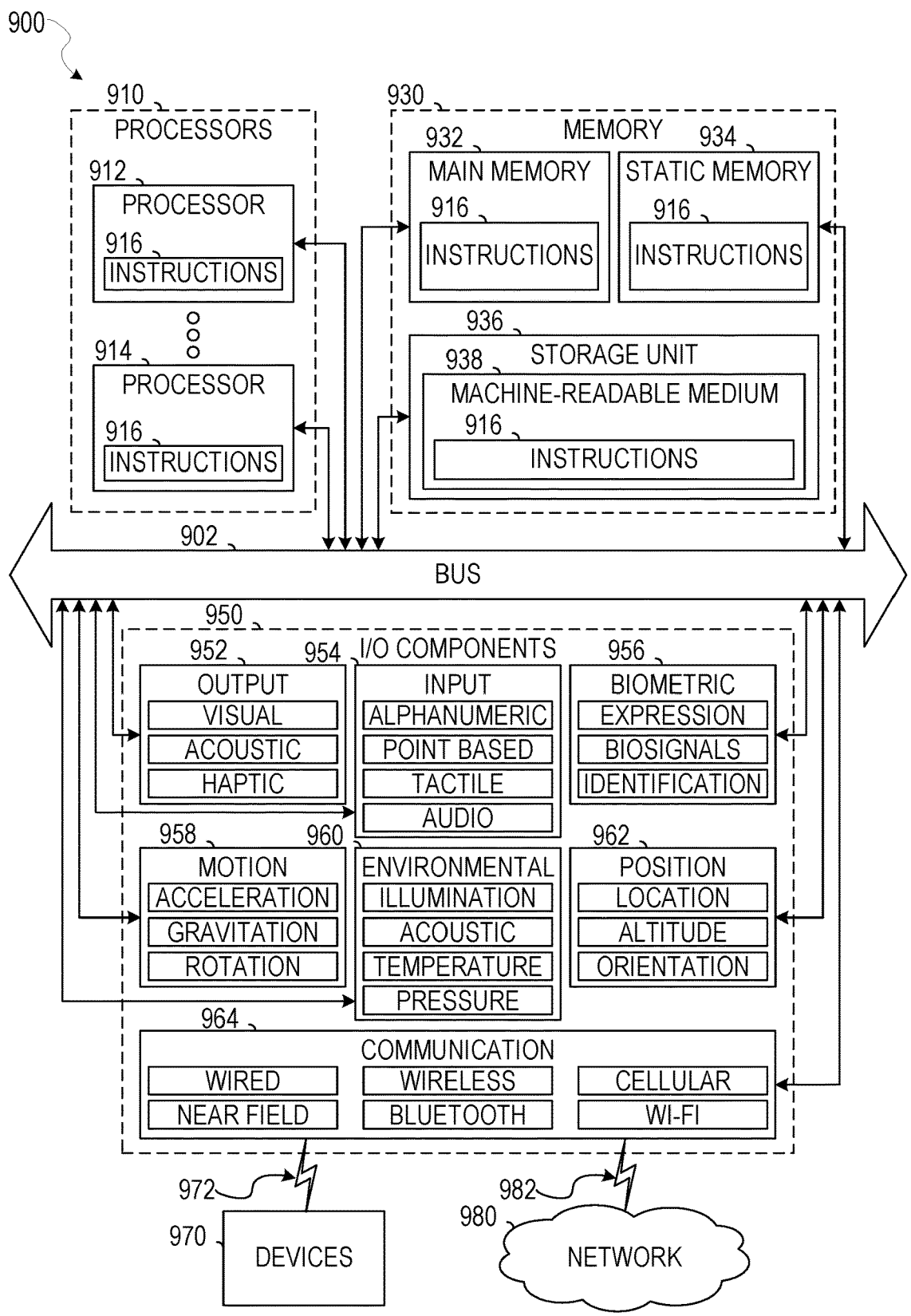
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. In alternative embodiments, the machine 900 operates as a stand-alone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other via a bus 902. In an example embodiment, the processors 910 (e.g., a CPU, a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (also referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936 accessible to the processors 910 via the bus 902. The storage unit 936 may include a machine-readable medium 938 on which are stored the instructions 916 embodying any one or more of the methodologies or functions described herein. The instructions 916 may also reside, completely or at least partially, within the main memory 932, within the static memory 934, within at least one of the processors 910 (e.g., within the processor's cache memory), or any suitable combination thereof, during execution thereof by the machine 900. Accordingly, in various implementations, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory.

While the machine-readable medium 938 is shown in an example embodiment to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, in some implementations, the communication components 964 detect identifiers or include components operable to detect identifiers. For example, the communication components 964 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 as "non-transitory" should not be construed to mean that the medium is incapable of movement; the medium should be considered as being transportable from one physical location to another. Additionally, since the machine-readable medium 938 is tangible, the medium may be considered to be a machine-readable device.

Glossary

"CARRIER SIGNAL" in this context refers to any intangible medium that is capable of storing, encoding, or carrying instructions 916 for execution by the machine 900, and includes digital or analog communications signals or other intangible medium to facilitate communication of such instructions 916. Instructions 916 may be transmitted or received over the network 980 using a transmission medium via a network interface device and using any one of a number of well-known transfer protocols.

"CLIENT DEVICE" in this context refers to any machine 900 that interfaces to a communications network 980 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, IoT devices, or any other communication device that a user may use to access a network 980.

"COMMUNICATIONS NETWORK" in this context refers to one or more portions of a network 980 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 980 or a portion of a network 980 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions 916 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions 916 (e.g., code) for execution by a machine 900, such that the instructions 916, when executed by one or more processors 910 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 910) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 910 or other programmable processor 910. Once configured by such software, hardware components become specific machines 900 (or specific components of a machine 900) uniquely tailored to perform the configured functions and are no longer general-purpose processors 910. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 910 configured by software to become a special-purpose processor, the general-purpose processor 910 may be configured as respectively different special-purpose processors (e.g., comprising different hardware components) at different times. Software accordingly configures a particular processor or processors 910, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices and can operate on a resource (e.g., a collection of information). The various operations of example methods described herein may be performed, at least partially, by one or more processors 910 that are temporarily configured (e.g., by software) or permanently configured to perform the relevant operations. Whether temporarily or permanently configured, such processors 910 may constitute processor-implemented components that operate to perform one or more operations or functions described herein. As used herein, "processor-implemented component" refers to a hardware component implemented using one or more processors 910. Similarly, the methods described herein may be at least partially processor-implemented, with a particular processor or processors 904 being an example of hardware. For example, at least some of the operations of a method may be performed by one or more processors 910 or processor-implemented components. Moreover, the one or more processors 910 may also operate to support performance of the relevant operations in a "cloud computing" environment or as a "software as a service" (SaaS). For example, at least some of the operations may be performed by a group of computers (as examples of machines 900 including processors 910), with these operations being accessible via a network 980 (e.g., the Internet) and via one or more appropriate interfaces (e.g., an API). The performance of certain of the operations may be distributed among the processors 910, not only residing within a single machine 900, but deployed across a number of machines 900. In some example embodiments, the processors 910 or processor-implemented components may be located in a single geographic location (e.g., within a home environment, an office environment, or a server farm). In other example embodiments, the processors 910 or processor-implemented components may be distributed across a number of geographic locations.

"PROCESSOR" in this context refers to any circuit or virtual circuit (a physical circuit emulated by logic executing on an actual processor 910) that manipulates data values according to control signals (e.g., "commands," "op codes," "machine code," etc.) and which produces corresponding output signals that are applied to operate a machine 900. A processor 910 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 910 may further be a multi-core processor having two or more independent processors 910 (sometimes referred to as "cores") that may execute instructions 916 contemporaneously.

What is claimed is:

1. A method comprising:
accessing, by one or more processors, a local manifest that identifies a first module, a first local hash of the first module, a second module, a second local hash of the second module, a first memory region for the first module, and a second memory region for the second module;
accessing, by the one or more processors, a remote manifest that identifies the first module, a first remote hash of the first module, the second module, and a second remote hash of the second module;
determining that the first local hash is different from the first remote hash;
determining that the second local hash is equal to the second remote hash; and
receiving, over a network, the first module without receiving the second module.

2. The method of claim 1, further comprising:
multiplexing, on a single connection, multiple data streams comprising a first data stream for communication by an application and a second data stream for receiving the first module.

3. The method of claim 1, further comprising:
decrypting the received first module;
generating a hash of the received first module; and
comparing the generated hash to the first remote hash to verify the received first module.

4. The method of claim 1, further comprising:
transmitting, over the network, the local manifest; and
receiving, over the network, the remote manifest.

5. The method of claim 1, wherein the first module of the local manifest is an application module.

6. The method of claim 1, wherein the first module of the local manifest is a kernel module.

7. The method of claim 1, wherein:
the local manifest further identifies a third module;
the remote manifest further identifies the third module; and
the method further comprises:
receiving, over the network, the third module;
validating the received first module;
validating the received third module; and
installing the received first module and the received third module based on the validating of the received first module and the received third module.

8. A system comprising:
one or more computer processors; and
one or more computer-readable mediums storing instructions that, when executed by the one or more computer processors, cause the system to perform operations comprising:
accessing a local manifest that identifies a first module, a first local hash of the first module, a second module, a second local hash of the second module, a first memory region for the first module, and a second memory region for the second module;
accessing a remote manifest that identifies the first module, a first remote hash of the first module, the second module, and a second remote hash of the second module;
determining that the first local hash is different from the first remote hash;
determining that the second local hash is equal to the second remote hash; and
receiving, over a network, the first module without receiving the second module.

9. The system of claim 8, wherein the operations further comprise:
multiplexing, on a single connection, multiple data streams comprising a first data stream for communication by an application and a second data stream for receiving the first module.

10. The system of claim 8, wherein the operations further comprise:
decrypting the received first module;
generating a hash of the received first module; and
comparing the generated hash to the first remote hash to verify the received first module.

11. The system of claim 8, wherein the operations further comprise:
transmitting, over the network, the local manifest; and
receiving, over the network, the remote manifest.

12. The system of claim 8, wherein:
the local manifest further identifies a third module;
the remote manifest further identifies the third module; and
the operations further comprise:
receiving, over the network, the third module;

validating the received first module;
validating the received third module; and
installing the received first module and the received third module based on the validating of the received first module and the received third module.

13. A non-transitory computer-readable medium storing instructions that, when executed by one or more computer processors of one or more computing devices, cause the one or more computing devices to perform operations comprising:
accessing a local manifest that identifies a first module, a first local hash of the first module, a second module, a second local hash of the second module, a first memory region for the first module, and a second memory region for the second module;
accessing a remote manifest that identifies the first module, a first remote hash of the first module, the second module, and a second remote hash of the second module;
determining that the first local hash is different from the first remote hash;
determining that the second local hash is equal to the second remote hash; and
receiving, over a network, the first module without receiving the second module.

14. The non-transitory computer-readable medium of claim 13, wherein the operations further comprise:
multiplexing, on a single connection, multiple data streams comprising a first data stream for communication by an application and a second data stream for receiving the first module.

15. The non-transitory computer-readable medium of claim 13, wherein the operations further comprise:
decrypting the received first module;
generating a hash of the received first module; and
comparing the generated hash to the first remote hash to verify the received first module.

16. The non-transitory computer-readable medium of claim 13, wherein the operations further comprise:
transmitting, over the network, the local manifest; and
receiving, over the network, the remote manifest.

17. The non-transitory computer-readable medium of claim 13, wherein the first module of the local manifest is an application module.

18. The system of claim 8, wherein the first module of the local manifest is an application module.

19. The non-transitory computer-readable medium of claim 13, wherein:
the local manifest further identifies a third module;
the remote manifest further identifies the third module; and
the operations further comprise:
receiving, over the network, the third module;
validating the received first module;
validating the received third module; and
installing the received first module and the received third module based on the validating of the received first module and the received third module.

20. The non-transitory computer-readable medium of claim 13, wherein the first module of the local manifest is a kernel module.

* * * * *